US008010385B1

(12) United States Patent
Henderson

(10) Patent No.: US 8,010,385 B1
(45) Date of Patent: Aug. 30, 2011

(54) METHOD AND SYSTEM FOR NOTIFYING HEALTHCARE CONSUMERS OF CHANGES IN INSURANCE COVERAGE STATUS FOR THEIR HEALTHCARE SERVICE PROVIDERS AND/OR MEDICATIONS

(75) Inventor: Ken Henderson, Folsom, CA (US)

(73) Assignee: Intuit Inc., Mountain View, CA (US)

( * ) Notice: Subject to any disclaimer, the term of this patent is extended or adjusted under 35 U.S.C. 154(b) by 691 days.

(21) Appl. No.: 12/112,361

(22) Filed: Apr. 30, 2008

(51) Int. Cl.
*A61B 5/00* (2006.01)
*G06F 19/00* (2011.01)

(52) U.S. Cl. .......................................................... 705/3

(58) Field of Classification Search .................. 705/2, 3
See application file for complete search history.

(56) References Cited

U.S. PATENT DOCUMENTS

| | | | |
|---|---|---|---|
| 2002/0019749 A1* | 2/2002 | Becker et al. | 705/2 |
| 2002/0138303 A1* | 9/2002 | Enos et al. | 705/2 |
| 2003/0191669 A1* | 10/2003 | Fitzgerald et al. | 705/2 |
| 2004/0122701 A1* | 6/2004 | Dahlin et al. | 705/2 |
| 2005/0216310 A1* | 9/2005 | Clements et al. | 705/3 |
| 2007/0179813 A1* | 8/2007 | Darling | 705/3 |
| 2008/0033750 A1* | 2/2008 | Burriss et al. | 705/2 |
| 2008/0077441 A1* | 3/2008 | Zubak et al. | 705/2 |

* cited by examiner

*Primary Examiner* — Gerald J. O'Connor
*Assistant Examiner* — Trang Nguyen
(74) *Attorney, Agent, or Firm* — Gunnison, McKay & Hodgson, L.L.P.; Philip McKay

(57) ABSTRACT

A process for providing healthcare consumers advance notice of changes in network status of their healthcare service providers and/or medications whereby data indicating one or more healthcare service providers and/or medications used by a given healthcare consumer is obtained along with data indicating the given healthcare consumer's healthcare insurance plan. Data indicating all "in-network" healthcare service providers and/or medications for the given healthcare consumer's healthcare insurance plan is then obtained. The data indicating one or more healthcare service providers and/or medications used by a given healthcare consumer is then compared with the data indicating all in-network healthcare service providers and/or medications for the given healthcare consumer's healthcare insurance plan. As a result of the comparison, if any of the one or more healthcare service providers and/or medications used by a given healthcare consumer is identified as no longer being an in-network healthcare service provider and/or medication, the given healthcare consumer is informed of the change of one or more of the one or more healthcare service providers and/or medications used by the given healthcare consumer to "out-of-network" status.

26 Claims, 3 Drawing Sheets

METHOD AND SYSTEM FOR NOTIFYING HEALTHCARE CONSUMERS OF CHANGES IN INSURANCE COVERAGE STATUS FOR THEIR HEALTHCARE SERVICE PROVIDERS AND/OR MEDICATIONS

BACKGROUND

Most healthcare insurance plans provide networks of "approved" or "in-network" healthcare service providers. Typically, in-network healthcare service providers for a given healthcare insurance plan are healthcare service providers who have agreed to provide healthcare services in accordance with the given healthcare insurance plan provider's rules, including limiting what they charge for healthcare services in accordance with the given healthcare insurance plan provider's guidelines. Similarly, most healthcare insurance plans include approved or "in-network" medications. Typically, the providers of these approved medications have also agreed to provide the medications in accordance with the given healthcare insurance plan provider's rules, again including limiting what they charge for a given medication in accordance with the given healthcare insurance plan provider's guidelines.

Typically, in order to receive the full benefit of their healthcare insurance plan, a healthcare consumer must utilize in-network healthcare service providers and/or medications. Consequently, when a given healthcare consumer that is covered by a given healthcare insurance plan utilizes in-network healthcare service providers and/or medications, there is typically significant "out-of-pocket" cost savings to the healthcare consumer.

As an illustrative example, under some healthcare insurance plans, when a given healthcare consumer that is covered by the healthcare insurance plan utilizes an in-network healthcare service provider, the healthcare insurance plan pays 80% of the costs and the maximum out-of-pocket cost to the healthcare consumer is capped at a predetermined amount. In contrast, under some healthcare insurance plans, when the given healthcare consumer that is covered by the healthcare insurance plan utilizes an "out-of-network" healthcare service provider, the healthcare insurance plan pays only 40% of the costs and there is no cap on the maximum out-of-pocket cost to the healthcare consumer.

In addition, under some healthcare insurance plans, when the given healthcare consumer that is covered by the healthcare insurance plan purchases/uses a medication that is approved by the healthcare insurance plan provider, the medication is paid for in full by the healthcare insurance plan, or in some cases the healthcare consumer must pay a small co-payment. On the other hand, under some healthcare insurance plans, when the given healthcare consumer that is covered by the healthcare insurance plan purchases/uses a medication that is not approved by the healthcare insurance plan provider, the entire cost of the medication is borne by the healthcare consumer as an out-of-pocket cost.

In light of the discussion above, it is apparent that, at least from a cost perspective, it is highly advantageous for a healthcare consumer to use in-network healthcare service providers and medications. In addition, as healthcare costs continue to rise, there will ever increasing pressure on healthcare consumers to be sure to utilize healthcare service providers and/or medications that are in-network healthcare service providers and/or medications. However, as the average age of the population of the United States continues to rise due, in part, to the aging of the "baby boomers", there is increasing demand for healthcare services and medications. As a result, many healthcare service providers, and medication providers, do not feel they need to be part of a healthcare insurance plan network and are no longer willing to accept the limitations imposed on them by the healthcare insurance plan providers. For this reason, and for various other possible reasons, healthcare service providers often drop their in-network status with a given healthcare insurance plan and many medications are taken off a given healthcare insurance plan's list of approved medications.

As a result of the situation described above, many healthcare consumers who have historically used a given healthcare service provider and/or medication can find themselves forced to change healthcare service providers and/or medications to avoid paying significantly larger healthcare service and/or medication fees for now "out-of-network" providers and/or medications. For many healthcare consumers, the prospect of changing healthcare service providers and/or medications is disturbing enough, however, to make matters worse, it often happens that a given healthcare consumer only discovers that his or her healthcare service provider and/or medication is no longer in the healthcare consumer's insurance plan network at the time the healthcare consumer needs the service and/or medication, or in some cases, after the healthcare service is provided and the healthcare consumer receives an unexpected bill.

In addition, under circumstances when a given healthcare consumer only discovers that his or her healthcare service provider and/or medication is no longer in the healthcare consumer's insurance plan network at the time the healthcare consumer needs the service and/or medication, the healthcare consumer typically has little or no time to research potential in-network replacements for his or her now out-of-network healthcare service provider and/or medication.

As a result of the situation described above, many healthcare consumers are currently subjected to significant amounts of stress and/or uncertainty because they are given insufficient notice that their healthcare service providers and/or medications are no longer in the healthcare consumer's insurance plan network.

SUMMARY

In accordance with one embodiment, a system and method for providing healthcare consumers advance notice of changes in network status of their healthcare service providers and/or medications includes a process for providing healthcare consumers advance notice of changes in network status of their healthcare service providers and/or medications whereby, in one embodiment, data indicating one or more healthcare service providers and/or medications used by a given healthcare consumer is obtained from one or more sources. In one embodiment, data indicating the given healthcare consumer's healthcare insurance plan is obtained. In one embodiment, data indicating all in-network healthcare service providers and/or medications for the given healthcare consumer's healthcare insurance plan, and/or data indicating healthcare service providers and/or medications recently removed from the healthcare insurance plan network, is obtained from one of more sources, including, but not limited to, the given healthcare consumer's healthcare insurance plan provider. In one embodiment, the data indicating one or more healthcare service providers and/or medications used by a given healthcare consumer is compared with the data indicating all in-network healthcare service providers and/or medications for the given healthcare consumer's healthcare insurance plan. In one embodiment, as a result of the comparison, one or more of the one or more healthcare service providers and/or medications used by a given healthcare consumer is identified as no longer being an in-network healthcare service provider and/or medication. In one embodiment, the given healthcare consumer is then informed of the change of one or more of the one or more healthcare service providers and/or medications used by the given healthcare consumer to "out-of-network" status via one of various notification mechanisms.

In one embodiment, all, or part, of the data indicating one or more healthcare service providers and/or medications used by a given healthcare consumer is obtained from the healthcare consumer by entering the data into a computing system, as defined herein, using a user interface device such as a keyboard, a mouse, a touchpad, voice command recognition system, or any other device capable of providing user input to a computing system, or for translating user actions into computing system operations, whether available or known at the time of filing and/or as developed later.

In one embodiment, all, or part, of the data indicating one or more healthcare service providers and/or medications used by a given healthcare consumer is obtained from a "hardcopy" or a digital/electronic copy of a personal health record associated with the healthcare consumer.

In one embodiment, all, or part, of the data indicating one or more healthcare service providers and/or medications used by a given healthcare consumer is obtained from any one or more of the following sources: the healthcare consumer's healthcare insurance plan provider; health insurance plan administrators for the healthcare consumer and/or the healthcare consumer's healthcare insurance plan; healthcare expense account program providers for the healthcare consumer; healthcare expense account program administrators for the healthcare consumer; healthcare service providers for the healthcare consumer, such as doctors, nurses, hospitals, clinics, therapists, pharmacists, pharmacies, and/or technicians; employers of the healthcare consumer; screen scraping data and/or websites containing data indicating one or more healthcare service providers and/or medications used by a given healthcare consumer; and/or any other sources and/or parties generating and/or having access to data indicating one or more healthcare service providers and/or medications used by a given healthcare consumer.

In one embodiment, all, or part, of the data indicating one or more healthcare service providers and/or medications used by a given healthcare consumer is obtained using and/or through a computing system implemented data management system such as, but not limited to: a computing system implemented healthcare management system; a computing system implemented personal financial management system; a computing system implemented business financial management system; a computing system implemented personal accounting system; a computing system implemented business accounting system; a computing system implemented tax preparation system; or any other computing system implemented personal and/or business data management system.

In one embodiment, the data indicating the given healthcare consumer's healthcare insurance plan is obtained from the healthcare consumer by entering the data into a computing system, as defined herein, using a user interface device such as a keyboard, a mouse, a touchpad, voice command recognition system, or any other device capable of providing user input to a computing system, or for translating user actions into computing system operations, whether available or known at the time of filing or as developed later.

In one embodiment, the data indicating the given healthcare consumer's healthcare insurance plan is obtained from a hardcopy or a digital/electronic copy of a personal health record associated with the healthcare consumer.

In one embodiment, the data indicating the given healthcare consumer's healthcare insurance plan is obtained from any one or more of the following sources: health insurance plan administrators for the healthcare consumer and/or the healthcare consumer's healthcare insurance plan; healthcare expense account program providers for the healthcare consumer; healthcare expense account program administrators for the healthcare consumer; healthcare service providers for the healthcare consumer; employers of the healthcare consumer; screen scraping data and/or websites; and/or any other sources and/or parties generating and/or having access to the data indicating the given healthcare consumer's healthcare insurance plan.

In one embodiment, the data indicating the given healthcare consumer's healthcare insurance plan is obtained using and/or through a computing system implemented data management system, as defined herein.

In one embodiment, all, or part, of the data indicating all in-network healthcare service providers and/or medications for the given healthcare consumer's healthcare insurance plan, and/or data indicating healthcare service providers and/or medications recently removed from the healthcare insurance plan network, is obtained on a periodic basis such as, but not limited to: hourly; daily; weekly; monthly; quarterly; or any period defined and/or desired.

In one embodiment, all, or part, of the data indicating all in-network healthcare service providers and/or medications for the given healthcare consumer's healthcare insurance plan, and/or data indicating healthcare service providers and/or medications recently removed from the healthcare insurance plan network, is obtained from the given healthcare consumer's healthcare insurance plan provider.

In one embodiment, all, or part, of the data indicating all in-network healthcare service providers and/or medications for the given healthcare consumer's healthcare insurance plan, and/or data indicating healthcare service providers and/or medications recently removed from the healthcare insurance plan network, is obtained from any one or more of the following sources: health insurance plan administrators for the healthcare consumer and/or the healthcare consumer's healthcare insurance plan; healthcare expense account program providers for the healthcare consumer; healthcare expense account program administrators for the healthcare consumer; healthcare service providers for the healthcare consumer; employers of the healthcare consumer; screen scraping data and/or websites; and/or any other sources and/or parties generating and/or having access to the data.

In one embodiment, all, or part, of the data indicating all in-network healthcare service providers and/or medications for the given healthcare consumer's healthcare insurance plan, and/or data indicating healthcare service providers and/or medications recently removed from the healthcare insurance plan network, is obtained using and/or through a computing system implemented data management system, as defined herein.

In one embodiment, the data indicating one or more healthcare service providers and/or medications used by a given healthcare consumer is compared with the data indicating all in-network healthcare service providers and/or medications for the given healthcare consumer's healthcare insurance plan, and/or data indicating healthcare service providers and/or medications recently removed from the healthcare insurance plan network, on a periodic basis such as, but not limited to: hourly; daily; weekly; monthly; quarterly; or any period defined and/or desired.

In one embodiment, as a result of the comparison of the data indicating one or more healthcare service providers and/ or medications used by a given healthcare consumer with the data indicating all in-network healthcare service providers and/or medications for the given healthcare consumer's healthcare insurance plan, and/or data indicating healthcare service providers and/or medications recently removed from the healthcare insurance plan network, one or more of the one or more healthcare service providers and/or medications used by a given healthcare consumer is identified as no longer being an in-network healthcare service provider and/or medication.

In one embodiment, data indicating all in-network healthcare service providers and/or medications for the given healthcare consumer's healthcare insurance plan, and/or data indicating healthcare service providers and/or medications recently added to the healthcare insurance plan network is obtained.

In one embodiment, a comparison of the data indicating one or more healthcare service providers and/or medications used by a given healthcare consumer with the data indicating all in-network healthcare service providers and/or medications for the given healthcare consumer's healthcare insurance plan, and/or data indicating healthcare service providers and/or medications recently added to the healthcare insurance plan network is performed. In one embodiment, as a result of the comparison of the data indicating one or more healthcare service providers and/or medications used by a given healthcare consumer with the data indicating all in-network healthcare service providers and/or medications for the given healthcare consumer's healthcare insurance plan, and/or data indicating healthcare service providers and/or medications recently added to the healthcare insurance plan network, one or more of the one or more healthcare service providers and/or medications used by a given healthcare consumer is identified as now being an in-network healthcare service provider and/or medication.

In one embodiment, the given healthcare consumer is informed of the change of one or more of the one or more healthcare service providers and/or medications used by the given healthcare consumer to out-of-network status or in-network status via any one of various means and/or mechanisms.

For instance, in one embodiment, the given healthcare consumer is informed of the change of one or more of the one or more healthcare service providers and/or medications used by the given healthcare consumer to out-of-network status or in-network status via one or more computing systems. In one embodiment, the given healthcare consumer is informed of the change of one or more of the one or more healthcare service providers and/or medications used by the given healthcare consumer to out-of-network or in-network status by placing data representing the notification on/in one or more databases, and/or in one or more accounts/locations of a database.

In one embodiment, the given healthcare consumer is informed of the change of one or more of the one or more healthcare service providers and/or medications used by the given healthcare consumer to out-of-network or in-network status through/using one or more computing system implemented data management systems, as defined herein.

In one embodiment, the given healthcare consumer is informed of the change of one or more of the one or more healthcare service providers and/or medications used by the given healthcare consumer to out-of-network or in-network status via e-mail, text messaging, or through/using a computer program product, as defined herein.

In one embodiment, the given healthcare consumer is informed of the change of one or more of the one or more healthcare service providers and/or medications used by the given healthcare consumer to out-of-network or in-network status via traditional postal service and/or telephone.

In other embodiments, the given healthcare consumer is informed of the change of one or more of the one or more healthcare service providers and/or medications used by the given healthcare consumer to out-of-network or in-network status by any means, mechanism, process, and/or procedure, for informing the healthcare consumer, as discussed herein, known in the art at the time of filing, or as developed after the time of filing.

In one embodiment, when the given healthcare consumer is informed of the change of one or more of the one or more healthcare service providers and/or medications used by the given healthcare consumer to out-of-network status, the given healthcare consumer is also provided with one or more potential in-network replacements for the now out-of-network healthcare service providers and/or medications. In one embodiment, various information and/or analysis of the one or more potential in-network replacements is also provided to the given healthcare consumer.

Using the system and method for providing healthcare consumers advance notice of changes in network status of their healthcare service providers and/or medications disclosed herein, a given healthcare consumer is automatically informed that a healthcare service provider and/or medication used by the given healthcare consumer is no longer in the healthcare consumer's healthcare insurance plan network, potentially before the healthcare consumer needs the service and/or medication. As a result, using the system and method for providing healthcare consumers advance notice of changes in network status of their healthcare service providers and/or medications disclosed herein, the healthcare consumer can potentially have time to research in-network replacements for his or her now out-of-network healthcare service provider and/or medication.

In addition, in some embodiments, using the system and method for providing healthcare consumers advance notice of changes in network status of their healthcare service providers and/or medications disclosed herein, the given healthcare consumer is provided with one or more potential in-network replacements for the now out-of-network healthcare service providers and/or medications and, in one embodiment, analysis data associated with the one or more potential in-network replacements.

Consequently, using the system and method for providing healthcare consumers advance notice of changes in network status of their healthcare service providers and/or medications disclosed herein, healthcare consumers can minimize the stress and/or uncertainty associated with having a healthcare service provider and/or medication leave their healthcare insurance plan's network.

BRIEF DESCRIPTION OF THE DRAWINGS

Common reference numerals are used throughout the FIG.s and the detailed description to indicate like elements.

Figure 1:
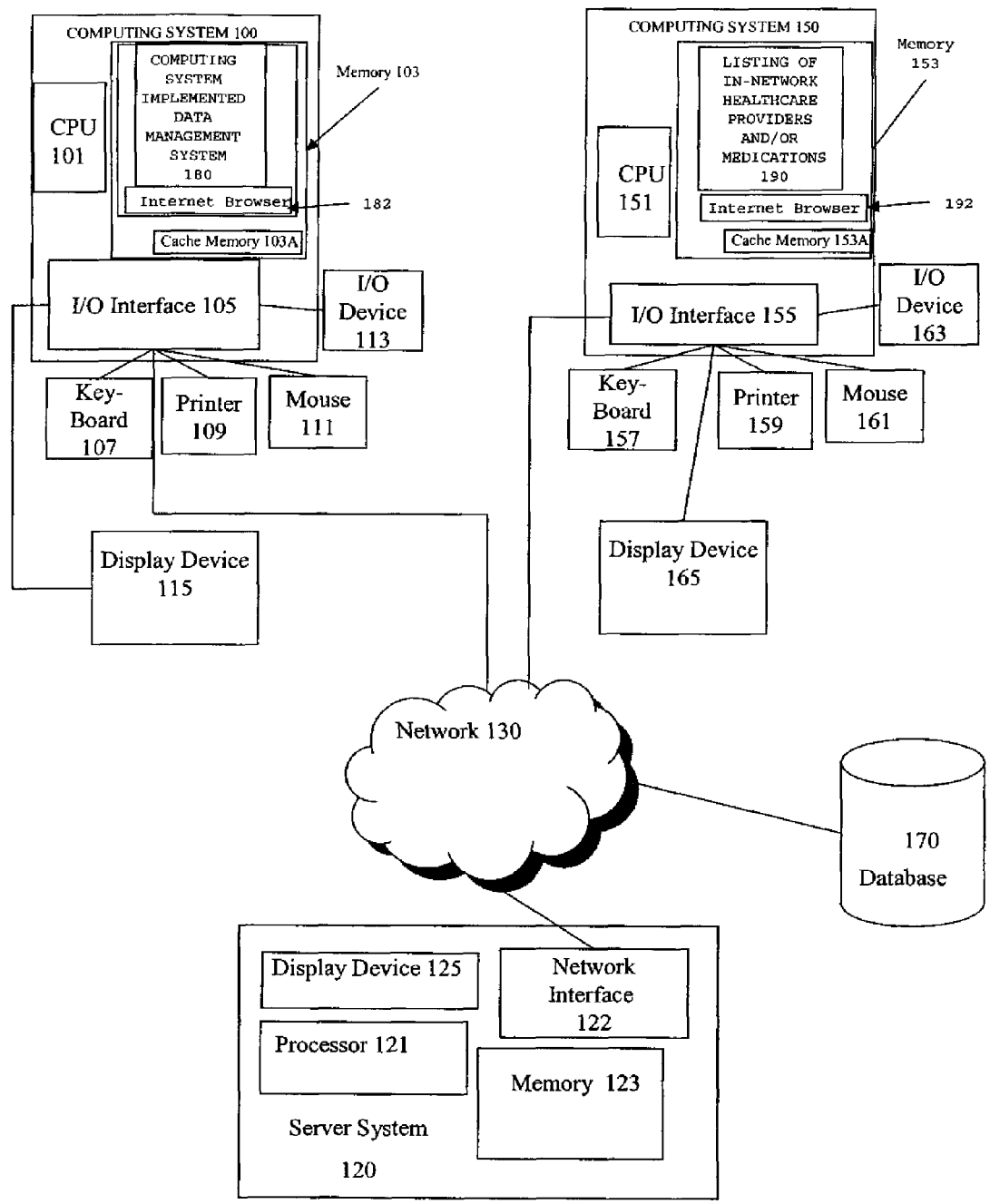
FIG. 1 is a block diagram of an exemplary hardware architecture for implementing one embodiment.

One skilled in the art will readily recognize that the above FIG.s are examples and that other architectures, modes of operation, orders of operation and elements/functions can be provided and implemented without departing from the characteristics and features of the invention, as set forth in the claims.

DETAILED DESCRIPTION

Embodiments will now be discussed with reference to the accompanying FIG.s, which depict one or more exemplary embodiments. Embodiments may be embodied in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

In accordance with one embodiment, a system and method for providing healthcare consumers advance notice of changes in network status of their healthcare service providers and/or medications includes a process for providing healthcare consumers advance notice of changes in network status of their healthcare service providers and/or medications whereby, in one embodiment, data indicating one or more healthcare service providers and/or medications used by a given healthcare consumer is obtained from one or more sources. In one embodiment, data indicating the given healthcare consumer's healthcare insurance plan is obtained. In one embodiment, data indicating all in-network healthcare service providers and/or medications for the given healthcare consumer's healthcare insurance plan, and/or data indicating healthcare service providers and/or medications recently removed from the healthcare insurance plan network, is obtained from one of more sources, including, but not limited to, the given healthcare consumer's healthcare insurance plan provider. In one embodiment, the data indicating one or more healthcare service providers and/or medications used by a given healthcare consumer is compared with the data indicating all in-network healthcare service providers and/or medications for the given healthcare consumer's healthcare insurance plan. In one embodiment, as a result of the comparison, one or more of the one or more healthcare service providers and/or medications used by a given healthcare consumer is identified as no longer being an in-network healthcare service provider and/or medication. In one embodiment, the given healthcare consumer is then informed of the change of one or more of the one or more healthcare service providers and/or medications used by the given healthcare consumer to out-of-network status via one of various notification mechanisms.

Hardware System Architecture

FIG. 1 is a block diagram of an exemplary hardware architecture for implementing one embodiment of a system and method for providing healthcare consumers advance notice of changes in network status of their healthcare service providers and/or medications, such as exemplary processes 200 (FIG. 2) and 300(FIG. 3) discussed herein, that, returning to FIG. 1, includes: a computing system 100, e.g., a first computing system; a computing system 150, e.g., a second computing system; a server system 120; and a database 170, all operatively coupled by a network 130.

As seen in FIG. 1, computing system 100 typically includes a central processing unit (CPU) 101, an input/output (I/O) interface 105, and a memory system 103, including cache memory 103A. In one embodiment, memory system 103 includes all, or part, of a computing system implemented data management system 180 such as any computing system implemented data management system defined herein, and/or known in the art at the time of filing, and/or as developed thereafter. In one embodiment, computing system implemented data management system 180 is stored, in whole, or in part, in memory system 103, and is used by, or includes, or is accessed by, a process for providing healthcare consumers advance notice of changes in network status of their healthcare service providers and/or medications.

Returning to FIG. 1, computing system 100 may further include standard user interface devices such as a keyboard 107, a mouse 111, a printer 109, and a display device 115, as well as, one or more standard input/output (I/O) devices 113, such as a compact disk (CD) or Digital Video Disc (DVD) drive, floppy disk drive, or other digital or waveform port, or other device capable of inputting data to, and outputting data from, computing system 100, whether available or known at the time of filing or as later developed. As discussed in more detail below, in one embodiment, a process for providing healthcare consumers advance notice of changes in network status of their healthcare service providers and/or medications and/or a computing system implemented data management system are entered, in whole, or in part, into computing system 100 via I/O device 113, such as from a CD, DVD, floppy disk, portable hard drive, memory stick, download site, or other medium and/or computer program product as defined herein.

In one embodiment, computing system 100 also includes an Internet browser capability 182 that, in one embodiment, includes a search engine (not shown) and is stored, in whole, or in part in memory 103.

In one embodiment, data representing all, or part, of a given healthcare consumer's health history and/or personal health record (not shown), in one or more formats, is stored, in whole, or in part, in memory system 103, and is used by, or is accessed by, a process for providing healthcare consumers advance notice of changes in network status of their healthcare service providers and/or medications and/or one or more healthcare consumers. In one embodiment, computing system 100 is a healthcare consumer computing system accessible by one or more healthcare consumers. In one embodiment, computing system 100 is used, and/or accessible, by another computing system, such as computing system 150 (discussed below).

In one embodiment, computing system 100 is used, controlled, and/or accessible by, a provider of and/or a computing system implemented data management system and data representing all, or part, of healthcare data associated with one or more consumers is stored in computing system 100, typically in accounts associated with a given healthcare consumer.

Computing system 100 can be any computing system as defined herein and/or as known in the art at the time of filing and/or as developed thereafter, that includes components that can execute all, or part, of a process for providing healthcare consumers advance notice of changes in network status of their healthcare service providers and/or medications, and/or a computing system implemented data management system, in accordance with at least one of the embodiments as described herein.

Similarly, computing system 150 typically includes a CPU 151, an input/output (I/O) interface 155, and a memory system 153, including cache memory 153A. Similar to computing system 100, computing system 150 may further include standard user interface devices such as a keyboard 157, a mouse 161, a printer 159, and a display device 165, as well as, one or more standard input/output (I/O) devices 163, such as a compact disk (CD) or DVD drive, floppy disk drive, or other digital or waveform port, or other device capable of inputting data to, and outputting data from, computing system 150, whether available or known at the time of filing or as later developed.

In one embodiment, computing system 150 also includes an Internet browser capability 192 that, in one embodiment, includes a search engine (not shown) and is stored, in whole, or in part in memory 153.

In one embodiment, memory system 153 includes all, or part, of data representing a listing of in-network healthcare service providers and/or medications associated with a given healthcare insurance plan 190. In one embodiment, data representing a listing of in-network healthcare service providers and/or medications associated with a given healthcare insurance plan 190 is stored, in whole, or in part, in memory system 153, and is used by, or includes, or is accessed by, a process for providing healthcare consumers advance notice of changes in network status of their healthcare service providers and/or medications.

In one embodiment, data representing all, or part, of a given healthcare consumer's health history and/or personal health record (not shown), in one or more formats, is stored, in whole, or in part, in memory system 153, and is used by, or is accessed by, a process for providing healthcare consumers advance notice of changes in network status of their healthcare service providers and/or medications and/or one or more healthcare consumers. In one embodiment, computing system 150 is a healthcare insurance plan provider's computing system accessible by one or more healthcare insurance plan providers. In one embodiment, computing system 150 is used, and/or accessible, by another computing system, such as computing system 100.

In one embodiment, computing system 150 is used, controlled, and/or accessible by, a provider of and/or a computing system implemented data management system and data representing all, or part, of healthcare data associated with one or more consumers (not shown) is stored in computing system 150, typically in accounts associated with a given healthcare consumer.

Computing system 150 can be any computing system as defined herein and/or as known in the art at the time of filing and/or as developed thereafter, that includes components that can execute all, or part, of a process for providing healthcare consumers advance notice of changes in network status of their healthcare service providers and/or medications, and/or a computing system implemented data management system, in accordance with at least one of the embodiments as described herein.

As discussed in more detail below, in one embodiment, all, or part, of a process for providing healthcare consumers advance notice of changes in network status of their healthcare service providers and/or medications, and/or a computing system implemented data management system, and/or data representing all, or part, of a given healthcare consumer's health history and/or personal health record, and/or data representing a listing of in-network healthcare service providers and/or medications associated with a given healthcare insurance plan, can be loaded, in whole, or in part, into computing system 150 from computing system 100 for storage in memory system 153 and/or cache memory 153A.

Also shown in FIG. 1 is database 170. In one embodiment, database 170 is a data storage device, a designated server system or computing system, or a designated portion of one or more server systems or computing systems, such as computing systems 100, 150 and server system 120, or a distributed database, or an external and/or portable hard drive. In one embodiment, database 170 is a dedicated mass storage device implemented in software, hardware, or a combination of hardware and software. In one embodiment, database 170 includes a web-based function. As discussed in more detail below, in one embodiment, database 170 is under the control of a given healthcare consumer and/or user, and/or one or more agents for a given healthcare consumer and/or user, and/or a process for providing healthcare consumers advance notice of changes in network status of their healthcare service providers and/or medications, and/or a computing system implemented data management system, and/or a healthcare insurance plan provider.

In one embodiment, data representing all, or part, of a given healthcare consumer's health history and/or personal health record (not shown), and/or data representing a listing of in-network healthcare service providers and/or medications associated with a given healthcare insurance plan (not shown), in one or more formats, is stored, in whole, or in part, in database 170, and is used by, or is accessed by, a process for providing healthcare consumers advance notice of changes in network status of their healthcare service providers and/or medications. In one embodiment, database 170 is accessible by one or more healthcare consumers and/or users and/or healthcare insurance plan providers. In one embodiment, database 170 is used, and/or accessible, by a computing system, such as computing systems 100 and/or 150, and/or a server system, such as sever system 120 (discussed below).

In one embodiment, database 170 is used, controlled, and/or accessible by, a provider of and/or a computing system implemented data management system and data representing all, or part, of healthcare data associated with one or more consumers is stored in database 170.

In one embodiment, computing systems 100 and 150, and database 170, are coupled to a server system 120 through network 130. In one embodiment, server system 120 includes a server system display device 125, a server system processor 121, a server system memory 123, and a server system network interface 122.

In one embodiment, server system 120 is used in a station-to-station arrangement, such as a peer-to-peer, or hybrid peer-to-peer, arrangement, as an indexing and/or central server used to connect a first computing system, such as computing system 100, and a second computing system, such as computing system 150.

In one embodiment, data representing all, or part, of a given healthcare consumer's health history and/or personal health record, and/or data representing a listing of in-network healthcare service providers and/or medications associated with a given healthcare insurance plan, in one or more formats, is stored, in whole, or in part, in server system 120, and is used by, or is accessed by, a process for providing healthcare consumers advance notice of changes in network status of their healthcare service providers and/or medications. In one embodiment, server system 120 is accessible by one or more healthcare consumers and/or healthcare insurance plan providers. In one embodiment, server system 120 is used, and/or accessible, by a computing system, such as computing systems 100 and/or 150, and/or one or more databases, such as database 170.

In one embodiment, server system 120 is used, controlled, and/or accessible by, a provider of and/or a computing system implemented data management system and data representing all, or part, of healthcare data associated with one or more consumers is stored in server system 120.

Network 130 can be any network or network system as defined herein, known in the art at the time of filing, and/or as developed after the time of filing, capable of allowing communication between two or more computing systems, server systems, and/or databases.

Those of skill in the art will readily recognize that the components shown in FIG. 1, such as computing systems 100 and 150, database 170, server system 120, and their respective components, are shown for illustrative purposes only and that architectures with more or fewer components can implement, and benefit from, the invention. Moreover, one or more components of computing system 100, computing system 150, database 170, and server system 120 may be located remotely from their respective system and accessed via network 130. In addition, the particular type of, and configuration of, computing systems 100 and 150, database 170, and server system 120 are not relevant.

As discussed in more detail below, in one embodiment, a process for providing healthcare consumers advance notice of changes in network status of their healthcare service providers and/or medications, and/or a computing system implemented data management system, and/or data representing all, or part, of a given healthcare consumer's health history and/or personal health record, and/or data representing a listing of in-network healthcare service providers and/or medications associated with a given healthcare insurance plan, in one or more formats, is stored, in whole, or in part, in memory system 103 and/or cache memory 103A, of computing system 100, and/or memory system 153 and/or cache memory 153A of computing system 150, and/or in server memory system 123 of server system 120 and/or in database 170, and executed on computing system 100 and/or computing system 150. As used herein, a memory refers to a volatile memory, a non-volatile memory, or any combination of the two.

Although a process for providing healthcare consumers advance notice of changes in network status of their healthcare service providers and/or medications, and/or a computing system implemented data management system, are sometimes referred to herein, alternatively, as a process, an application, a module, a program, a component of a software system, a component of a software package, a component of a parent system, a plug-in, or a feature of a parent system, this terminology is illustrative only. In some embodiments, a process for providing healthcare consumers advance notice of changes in network status of their healthcare service providers and/or medications and/or a computing system implemented data management system are capable of being called from an application or the operating system. In one embodiment, an application, process, or program is generally defined to be any executable code. Moreover, those of skill in the art will understand that when it is said that an application, process, or an operation takes some action, the action is the result of executing one or more instructions by a processor, such as CPUs 101 and 151, or server system processor 121. In one embodiment, execution of a process by CPU 101, CPU 151, or server system processor 121, results in the operations of an agent computer process (not shown) and/or a rule computer process (not shown).

In one embodiment, a process for providing healthcare consumers advance notice of changes in network status of their healthcare service providers and/or medications, and/or a computing system implemented data management system, and/or data representing all, or part, of a given healthcare consumer's health history and/or personal health record, and/or data representing a listing of in-network healthcare service providers and/or medications associated with a given healthcare insurance plan, are computer applications or processes and/or data implemented and/or run and/or stored, in full, or in part, in, or on, and/or through, a computer program product. Herein, a computer program product comprises a medium and/or I/O device configured to store or transport computer readable code, whether available or known at the time of filing or as later developed. Some examples of computer program products are CDs, DVDs, ROM cards, floppy discs, magnetic tapes, computer hard drives, portable hard drives, flash memory, volatile and non-volatile memory sticks, servers on a network, such as server system 120 of FIG. 1, and signals transmitted over a network, such as network 130 of FIG. 1, or other media or process capable of delivering computer readable data representing computer readable code, whether available or known at the time of filing or as later developed. This medium may belong to a computing system, such as computing systems 100 and 150 of FIG. 1, described above. However, in some embodiments, the medium also may be removable and/or remote from the computing system.

Process

Herein, the terms "healthcare consumer", "consumer" and/or "user" denote any person, party or entity interacting with a process for providing healthcare consumers advance notice of changes in network status of their healthcare service providers and/or medications for the purpose of being notified of changes in insurance status of their healthcare service providers and/or medications, and/or any system and/or application under the direction/control of any person, party or entity interacting with a process for providing healthcare consumers advance notice of changes in network status of their healthcare service providers and/or medications for the purpose of being notified of changes in insurance status of their healthcare service providers and/or medications, and/or any authorized agent for any person, party or entity interacting with a process for providing healthcare consumers advance notice of changes in network status of their healthcare service providers and/or medications for the purpose of being notified of changes in insurance status of their healthcare service providers and/or medications.

Herein, the term "healthcare" includes any general and/or specialized treatment, assessment, maintenance, therapy, medication, and/or advice relating to all, or any portion of, a person's state of health, including but not limited to: general medical, specialized medical, surgical, dental, vision, psychological, and/or any other type of medical treatment, assessment, maintenance, therapy, medication, and/or advice.

Herein, the term "medical treatment" includes, but is not limited to: one or more medications and/or medication regimes; physical therapy; recommended dietary changes; recommended activity level changes; other lifestyle changes; and/or surgical procedures; and/or any prescribed and/or suggested regime, medication, treatment, activity, avoided activity, and/or program designed to improve, maintain, and/or slow the degradation of, a person's health.

Herein the terms "healthcare information" "health data", "health information", "healthcare data", "personal health profile", "personal health history" and "healthcare history information" are used interchangeably to denote, but are not limited to: data representing the historical utilization of healthcare services; data representing past medical treatments and/or claims; data indicating any recommended programs and/or medications; data representing known family medical history; clinical data regarding existing disease, diagnoses, allergies and/or treatment programs; data representing trends/patterns in specific clinical medical history and/or lab results; data indicating activities a person takes/take part in; data indicating all healthcare service providers and medications; data indicating healthcare insurance plans used by the healthcare consumer; data indicating and/or any other data that is indicative of the general health, health risks, health history, conditions, allergies, immunizations, and/or pre-dispositions to disease and/or injury associated with a healthcare consumer, and/or persons associated with, or dependent on, a healthcare consumer.

Herein, the term "healthcare benefit program" and "health insurance plan" are used interchangeably to denote any policy, program, means and/or mechanism whereby a healthcare consumer, or person associated with, or a dependent of, a healthcare consumer is provided benefits and/or service and/or entitlements to any form of healthcare service.

Herein the terms "healthcare insurance plan providers" and "healthcare benefit program administrators" include, but are not limited to: health insurance plan providers; health insurance plan administrators; healthcare expense account program providers; healthcare expense account program administrators; healthcare providers; employers; and/or any other parties generating and/or having access to healthcare data associated with a healthcare consumer, and/or persons associated with, or dependent on, a healthcare consumer.

Herein, the terms "healthcare service provider" and "healthcare provider" are used interchangeable to denote any individuals, persons, agencies, institutions, organizations, businesses, and/or other entities that provide medical treatment, medications, therapy, advice, and/or equipment. For example, herein, the term "healthcare service provider" includes, but is not limited to: doctors; nurses; technicians; therapists; pharmacists; counselors; alternative medicine practitioners; all medical facilities; doctor's offices; hospitals; emergency rooms; clinics; urgent care centers; alternative medicine clinics/facilities; physical therapy clinics/facilities; and any other party, entity, and/or facility providing general and/or specialized treatment, assessment, maintenance, therapy, medication, and/or advice relating to all, or any portion of, the state of health associated with a healthcare consumer, and/or persons associated with, or dependent on, a healthcare consumer, including but not limited to, general medical, specialized medical, surgical, dental, vision, psychological, and/or any other type of treatment, assessment, maintenance, therapy, medication, and/or advice.

As used herein, the term "computing system", denotes, but is not limited to: a portable computer; a workstation; a two-way pager; a cellular telephone; a smart phone; a digital wireless telephone; a Personal Digital Assistant (PDA); a media player, i.e., an MP3 player and/or other music and/or video player; a server computer; an Internet appliance; or any other device that includes components that can execute all, or part, of any one of the processes and/or operations as described herein. In addition, as used herein, the term computing system, can denote, but is not limited to, computing systems made up of multiple: computers; wireless devices; cellular telephones; digital telephones; two-way pagers; PDAs; media players; server computers; or any desired combination of these devices, that are coupled to perform the processes and/or operations as described herein.

As used herein, the term "computing system implemented data management system" includes, but is not limited to: computing system implemented healthcare management systems, packages, programs, modules, or applications; computing system implemented personal and small business financial management systems, packages, programs, modules, or applications; computing system implemented business systems, packages, programs, modules, or applications; computing system implemented marketing device distribution systems, packages, programs, modules, or applications; computing system implemented financial institution financial management systems, packages, programs, modules, or applications; computing system implemented tax preparation systems, packages, programs, modules, or applications; computing system implemented accounting and/or invoicing systems, packages, programs, modules, or applications; computing system implemented business and/or point of sale systems, packages, programs, modules, or applications; and various other electronic data driven data management systems, packages, programs, modules, or applications, whether known at the time of filling or as developed later.

As used herein, the term "network" is used to denote any network or network system such as, but not limited to, a peer-to-peer network, a hybrid peer-to-peer network, a Local Area Network (LAN), a Wide Area Network (WAN), a public network, such as the Internet, a private network, a cellular network, a combination of different network types, or other wireless, wired, and/or a wireless and wired combination network capable of allowing communication between two or more computing systems, whether available or known at the time of filing or as later developed.

As used herein, the term "database" is used to define any data storage mechanism known at the time of filing or as developed thereafter, such as, but not limited to: a data storage device; a designated server system or computing system, or a designated portion of one or more server systems or computing systems; a mobile computing system; a server system network; a distributed database; or an external and/or portable hard drive. Herein, the term "database" can refer to a dedicated mass storage device implemented in software, hardware, or a combination of hardware and software. Herein, the term "database" can refer to a web-based function. Herein, the term "database" can refer to data storage means that is part of, or under the control of, any computing system, as defined herein, known at the time of filing, or as developed thereafter.

In accordance with one embodiment, a system and method for providing healthcare consumers advance notice of changes in network status of their healthcare service providers and/or medications includes a process for providing healthcare consumers advance notice of changes in network status of their healthcare service providers and/or medications whereby, in one embodiment, data indicating one or more healthcare service providers and/or medications used by a given healthcare consumer is obtained from one or more sources. In one embodiment, data indicating the given healthcare consumer's healthcare insurance plan is obtained. In one embodiment, data indicating all in-network healthcare service providers and/or medications for the given healthcare consumer's healthcare insurance plan, and/or data indicating healthcare service providers and/or medications recently removed from the healthcare insurance plan network, is obtained from one of more sources, including, but not limited to, the given healthcare consumer's healthcare insurance plan provider. In one embodiment, the data indicating one or more healthcare service providers and/or medications used by a given healthcare consumer is compared with the data indicating all in-network healthcare service providers and/or medications for the given healthcare consumer's healthcare insurance plan. In one embodiment, as a result of the comparison, one or more of the one or more healthcare service providers and/or medications used by a given healthcare consumer is identified as no longer being an in-network healthcare service provider and/or medication. In one embodiment, the given healthcare consumer is then informed of the change of one or more of the one or more healthcare service providers and/or medications used by the given healthcare consumer to out-of-network status via one of various notification mechanisms.

Figure 2:
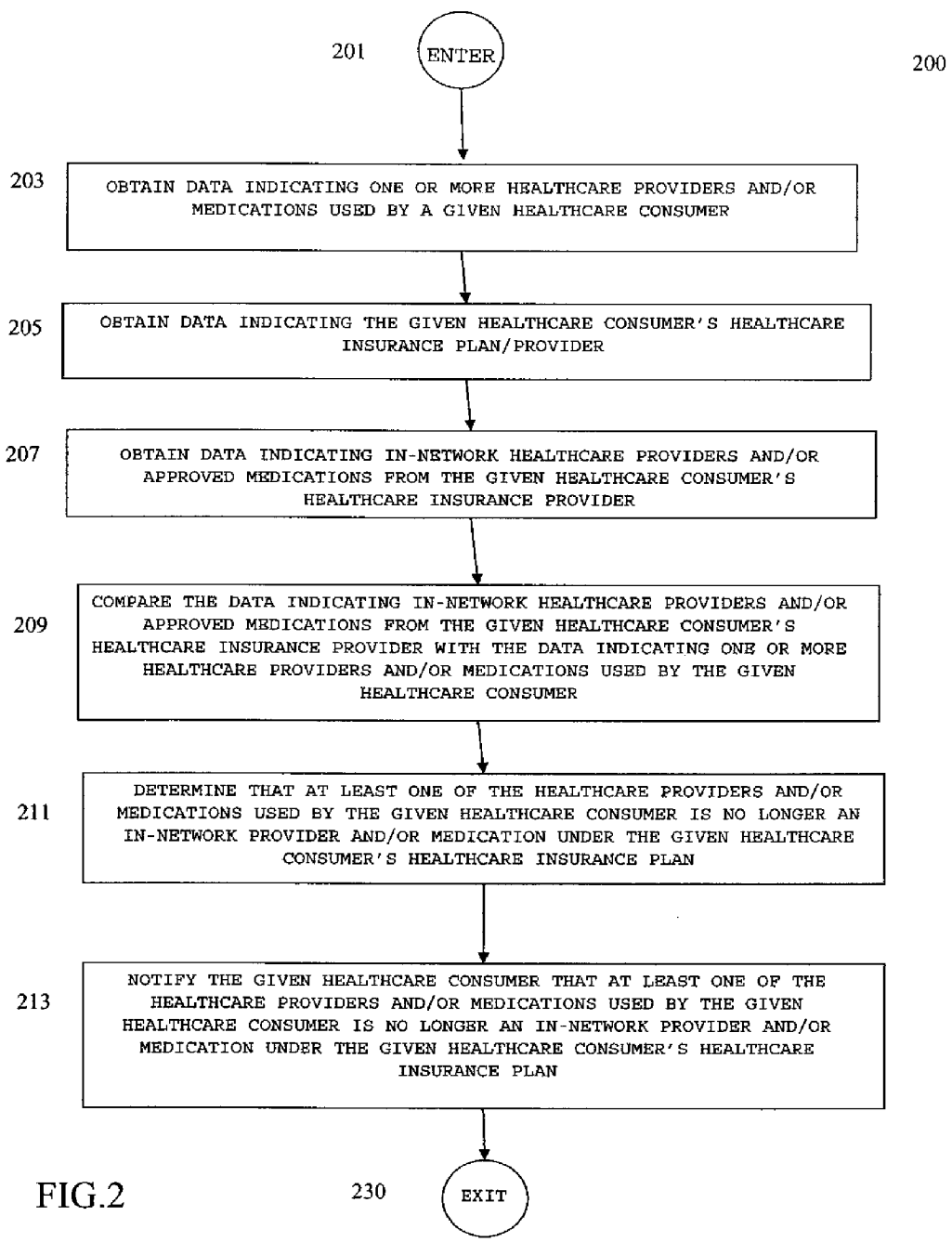
FIG. 2 is a flow chart depicting a process for providing healthcare consumers advance notice of changes in network status of their healthcare service providers and/or medications in accordance with one embodiment.

FIG. 2 is a flow chart depicting a process for providing healthcare consumers advance notice of changes in network status of their healthcare service providers and/or medications 200 in accordance with one embodiment. Process for providing healthcare consumers advance notice of changes in network status of their healthcare service providers and/or medications 200 begins at ENTER OPERATION 201 of FIG. 2 and process flow proceeds to OBTAIN DATA INDICATING ONE OR MORE HEALTHCARE PROVIDERS AND/OR MEDICATIONS USED BY A GIVEN HEALTHCARE CONSUMER OPERATION 203.

In one embodiment, at OBTAIN DATA INDICATING ONE OR MORE HEALTHCARE PROVIDERS AND/OR MEDICATIONS USED BY A GIVEN HEALTHCARE CONSUMER OPERATION 203 data indicating one or more healthcare service providers and/or medications used by a given healthcare consumer is obtained from one or more sources.

In one embodiment, at OBTAIN DATA INDICATING ONE OR MORE HEALTHCARE PROVIDERS AND/OR MEDICATIONS USED BY A GIVEN HEALTHCARE CONSUMER OPERATION 203, all, or part, of the data indicating one or more healthcare service providers and/or medications used by the given healthcare consumer is obtained from the given healthcare consumer. In one embodiment, the data indicating one or more healthcare service providers and/or medications used by the given healthcare consumer is obtained from the given healthcare consumer by way of the given healthcare consumer entering the data into a computing system, such as computing system 100 of FIG. 1, using a user interface device such as: a keyboard, such as keyboard 107; a mouse, such as mouse 111; a touchpad (not shown); a voice command recognition system (not shown); or any other device capable of providing user input to a computing system, or for translating user actions into computing system operations, whether available or known at the time of filing or as developed later.

Returning to FIG. 2, in one embodiment, at OBTAIN DATA INDICATING ONE OR MORE HEALTHCARE PROVIDERS AND/OR MEDICATIONS USED BY A GIVEN HEALTHCARE CONSUMER OPERATION 203, all, or part, of the data indicating one or more healthcare service providers and/or medications used by a given healthcare consumer is obtained from a hardcopy of a personal health record associated with the given consumer. In one embodiment, all, or part, of the hardcopy of the personal health record associated with the given consumer is scanned into an electronic data format and/or transferred/entered into: a computing system, such as computing systems 100 and/or 150 of FIG. 1; and/or a server system, such as server system 120 of FIG. 1; and/or a database, such as database 170 of FIG. 1, implementing, and/or associated with, at least part of process for providing healthcare consumers advance notice of changes in network status of their healthcare service providers and/or medications 200 of FIG. 2, and/or one or more healthcare consumers.

Returning to FIG. 2, in one embodiment, at OBTAIN DATA INDICATING ONE OR MORE HEALTHCARE PROVIDERS AND/OR MEDICATIONS USED BY A GIVEN HEALTHCARE CONSUMER OPERATION 203, all, or part, of the data indicating one or more healthcare service providers and/or medications used by a given healthcare consumer is obtained from a digital/electronic copy of a personal health record associated with the healthcare consumer. In one embodiment, all, or part, of the digital/electronic copy of a personal health record associated with the healthcare consumer is transferred/entered into and/or stored in: a computing system, such as computing systems 100 and/or 150 of FIG. 1; and/or a server system, such as server system 120 of FIG. 1; and/or a database, such as database 170 of FIG. 1, implementing, and/or associated with, at least part of process for providing healthcare consumers advance notice of changes in network status of their healthcare service providers and/or medications 200 of FIG. 2, and/or one or more healthcare consumers. In one embodiment, the digital/electronic copy of a personal health record associated with the healthcare consumer is obtained from a computing system implemented data management system, such as a computing system implemented healthcare management system.

Returning to FIG. 2, in one embodiment, at OBTAIN DATA INDICATING ONE OR MORE HEALTHCARE PROVIDERS AND/OR MEDICATIONS USED BY A GIVEN HEALTHCARE CONSUMER OPERATION 203, all, or part, of the data indicating one or more healthcare service providers and/or medications used by a given healthcare consumer is obtained from any one or more of the following sources: the healthcare consumer's healthcare insurance plan provider; health insurance plan administrators for the healthcare consumer and/or the healthcare consumer's healthcare insurance plan; healthcare expense account program providers for the healthcare consumer; healthcare expense account program administrators for the healthcare consumer; healthcare service providers for the healthcare consumer; employers of the healthcare consumer; screen scraping data and/or websites containing data indicating one or more healthcare service providers and/or medications used by a given healthcare consumer; and/or any other sources and/or parties generating and/or having access to data indicating one or more healthcare service providers and/or medications used by a given healthcare consumer.

Returning to FIG. 2, in one embodiment, at OBTAIN DATA INDICATING ONE OR MORE HEALTHCARE PROVIDERS AND/OR MEDICATIONS USED BY A GIVEN HEALTHCARE CONSUMER OPERATION 203, all, or part, of the data indicating one or more healthcare service providers and/or medications used by a given healthcare consumer is obtained using and/or through a computing system implemented data management system, such as, computing system implemented data management system 180. In one embodiment, the computing system implemented data management system is, but is not limited to, a computing system implemented healthcare management system, or any other computing system implemented personal and/or business data management system.

Returning to FIG. 2, in one embodiment, at OBTAIN DATA INDICATING ONE OR MORE HEALTHCARE PROVIDERS AND/OR MEDICATIONS USED BY A GIVEN HEALTHCARE CONSUMER OPERATION 203, all, or part, of the data indicating one or more healthcare service providers and/or medications used by a given healthcare consumer is obtained from any source of data indicating one or more healthcare service providers and/or medications used by a given healthcare consumer by any means, mechanism, process, or procedure, discussed herein, and/or known in the art at the time of filing, and/or as developed after the time of filing.

In one embodiment, once data indicating one or more healthcare service providers and/or medications used by a given healthcare consumer is obtained from one or more sources at OBTAIN DATA INDICATING ONE OR MORE HEALTHCARE PROVIDERS AND/OR MEDICATIONS USED BY A GIVEN HEALTHCARE CONSUMER OPERATION 203, process flow proceeds to OBTAIN DATA INDICATING THE GIVEN HEALTHCARE CONSUMER'S HEALTHCARE INSURANCE PLAN/PROVIDER OPERATION 205.

In one embodiment, at OBTAIN DATA INDICATING THE GIVEN HEALTHCARE CONSUMER'S HEALTH- CARE INSURANCE PLAN/PROVIDER OPERATION 205 data indicating the given healthcare consumer's healthcare insurance plan and/or provider is obtained.

In one embodiment, at OBTAIN DATA INDICATING THE GIVEN HEALTHCARE CONSUMER'S HEALTHCARE INSURANCE PLAN/PROVIDER OPERATION 205, the data indicating the given healthcare consumer's healthcare insurance plan is obtained from the given healthcare consumer. In one embodiment, the data indicating the given healthcare consumer's healthcare insurance plan is obtained from the given healthcare consumer by way of the given healthcare consumer entering the data into a computing system, such as computing system 100 of FIG. 1, using a user interface device.

Returning to FIG. 2, in one embodiment, at OBTAIN DATA INDICATING THE GIVEN HEALTHCARE CONSUMER'S HEALTHCARE INSURANCE PLAN/PROVIDER OPERATION 205, the data indicating the given healthcare consumer's healthcare insurance plan is obtained from a hardcopy of a personal health record associated with the given consumer. In one embodiment, all, or part, of the hardcopy of the personal health record associated with the given consumer is scanned into an electronic data format and/or transferred/entered into a computing system, a server system, and/or a database implementing, and/or associated with, at least part of process for providing healthcare consumers advance notice of changes in network status of their healthcare service providers and/or medications 200 of FIG. 2, and/or one or more healthcare consumers.

Returning to FIG. 2, in one embodiment, at OBTAIN DATA INDICATING THE GIVEN HEALTHCARE CONSUMER'S HEALTHCARE INSURANCE PLAN/PROVIDER OPERATION 205, the data indicating the given healthcare consumer's healthcare insurance plan is obtained from a digital/electronic copy of a personal health record associated with the healthcare consumer. In one embodiment, all, or part, of the digital/electronic copy of a personal health record associated with the healthcare consumer is transferred/entered into and/or stored in a computing system, and/or a server system, and/or a database, implementing, and/or associated with, at least part of process for providing healthcare consumers advance notice of changes in network status of their healthcare service providers and/or medications 200 of FIG. 2, and/or one or more healthcare consumers.

Returning to FIG. 2, in one embodiment, at OBTAIN DATA INDICATING THE GIVEN HEALTHCARE CONSUMER'S HEALTHCARE INSURANCE PLAN/PROVIDER OPERATION 205, the data indicating the given healthcare consumer's healthcare insurance plan is obtained from any one or more of the following sources: health insurance plan administrators for the healthcare consumer and/or the healthcare consumer's healthcare insurance plan; healthcare expense account program providers for the healthcare consumer; healthcare expense account program administrators for the healthcare consumer; healthcare service providers for the healthcare consumer; employers of the healthcare consumer; screen scraping data and/or websites; and/or any other sources and/or parties generating and/or having access to data indicating the given healthcare consumer's healthcare insurance plan.

Returning to FIG. 2, in one embodiment, at OBTAIN DATA INDICATING THE GIVEN HEALTHCARE CONSUMER'S HEALTHCARE INSURANCE PLAN/PROVIDER OPERATION 205, the data indicating the given healthcare consumer's healthcare insurance plan is obtained from and/or using and/or through a computing system implemented data management system, such as, computing system implemented data management system 180. In one embodiment, the computing system implemented data management system is, but is not limited to, a computing system implemented healthcare management system, or any other computing system implemented personal and/or business data management system.

Returning to FIG. 2, in one embodiment, at OBTAIN DATA INDICATING THE GIVEN HEALTHCARE CONSUMER'S HEALTHCARE INSURANCE PLAN/PROVIDER OPERATION 205, the data indicating the given healthcare consumer's healthcare insurance plan is obtained from any source of data indicating the given healthcare consumer's healthcare insurance plan by any means, mechanism, process, or procedure, discussed herein, and/or known in the art at the time of filing, and/or as developed after the time of filing.

In one embodiment, once data indicating the given healthcare consumer's healthcare insurance plan is obtained at OBTAIN DATA INDICATING THE GIVEN HEALTHCARE CONSUMER'S HEALTHCARE INSURANCE PLAN/PROVIDER OPERATION 205, process flow proceeds to OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207.

In one embodiment, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207 data indicating all in-network healthcare service providers and/or medications for the given healthcare consumer's healthcare insurance plan, and/or data indicating healthcare service providers and/or medications recently removed from the healthcare insurance plan network, is obtained from one of more sources.

In one embodiment, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207, all, or part, of the data indicating all in-network healthcare service providers and/or medications for the given healthcare consumer's healthcare insurance plan, and/or data indicating healthcare service providers and/or medications recently removed from the healthcare insurance plan network, is obtained on a periodic basis such as, but not limited to: hourly; daily; weekly; monthly; quarterly; or any period defined and/or desired.

In one embodiment, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207, all, or part, of the data indicating all in-network healthcare service providers and/or medications for the given healthcare consumer's healthcare insurance plan, and/or data indicating healthcare service providers and/or medications recently removed from the healthcare insurance plan network, is obtained from the given healthcare consumer's healthcare insurance plan provider.

In some cases, healthcare insurance plan providers distribute lists of all in-network healthcare service providers and/or medications for a given healthcare insurance plan. In some cases, healthcare insurance plan providers distribute lists indicating healthcare service providers and/or medications recently removed from the healthcare insurance plan network.

These lists are often made available to the healthcare consumer, and/or the public, via healthcare insurance plan provider web-sites, databases, such as listing of in-network healthcare service providers and/or medications associated with a given healthcare insurance plan 190 on database 170 of FIG. 1, and/or in printed form. In some instances, these lists are updated periodically.

Returning to FIG. 1, in instances where the lists are made available in printed form, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207, the information on printed lists is scanned into an electronic data format and/or transferred/entered into: a computing system, such as computing systems 100 and/or 150 of FIG. 1; and/or a server system, such as server system 120 of FIG. 1; and/or a database, such as database 170 of FIG. 1, implementing, and/or associated with, at least part of process for providing healthcare consumers advance notice of changes in network status of their healthcare service providers and/or medications 200 of FIG. 2, and/or one or more healthcare consumers.

Returning to FIG. 2, in instances where the lists are made available on a web-site, database, or in other electronic data format, such as listing of in-network healthcare service providers and/or medications associated with a given healthcare insurance plan 190 of FIG. 1, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207 (FIG. 2), the information is obtained directly and/or using screen scraping technology, or a similar mechanism, and then transferred/entered into: a computing system, such as computing systems 100 and/or 150 of FIG. 1; and/or a server system, such as server system 120 of FIG. 1; and/or a database, such as database 170 of FIG. 1, implementing, and/or associated with, at least part of process for providing healthcare consumers advance notice of changes in network status of their healthcare service providers and/or medications 200 of FIG. 2, and/or one or more healthcare consumers.

Returning to FIG. 2, in one embodiment, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207, all, or part, of the data indicating all in-network healthcare service providers and/or medications for the given healthcare consumer's healthcare insurance plan, and/or data indicating healthcare service providers and/or medications recently removed from the healthcare insurance plan network, is obtained from any one or more of the following sources: health insurance plan administrators for the healthcare consumer and/or the healthcare consumer's healthcare insurance plan; healthcare expense account program providers for the healthcare consumer; healthcare expense account program administrators for the healthcare consumer; healthcare service providers for the healthcare consumer; employers of the healthcare consumer; and/or any other party and/or program having access to the data.

In one embodiment, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207, all, or part, of the data indicating all in-network healthcare service providers and/or medications for the given healthcare consumer's healthcare insurance plan, and/or data indicating healthcare service providers and/or medications recently removed from the healthcare insurance plan network, is obtained using and/or through a computing system implemented data management system, as defined herein, such as, but not limited to, a computing system implemented healthcare management system.

In one embodiment, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207, all, or part, of the data indicating all in-network healthcare service providers and/or medications for the given healthcare consumer's healthcare insurance plan, and/or data indicating healthcare service providers and/or medications recently removed from the healthcare insurance plan network, is obtained from any source of data indicating the in-network healthcare service providers and/or medications for a given healthcare consumer's healthcare insurance plan by any means, mechanism, process, or procedure, discussed herein, known in the art at the time of filing, or as developed after the time of filing.

In one embodiment, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207, data indicating healthcare service providers and/or medications recently removed from the healthcare insurance plan network for the given healthcare consumer's healthcare insurance plan is determined by comparing newly received data indicating all in-network healthcare service providers and/or medications for the given healthcare consumer's healthcare insurance plan with previous data indicating all in-network healthcare service providers and/or medications for the given healthcare consumer's healthcare insurance plan. In one embodiment, differences in the two data sets are "flagging", or otherwise identified, and more particularly, healthcare service providers and/or medications that have been dropped in the newer data are identified. In one embodiment, the healthcare service providers and/or medications that have been dropped are then placed on a recently or "newly" dropped list.

In one embodiment, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207 data indicating all in-network healthcare service providers and/or medications for the given healthcare consumer's healthcare insurance plan, and/or data indicating healthcare service providers and/or medications recently added to the healthcare insurance plan network is obtained.

In one embodiment, once the data indicating all in-network healthcare service providers and/or medications for the given healthcare consumer's healthcare insurance plan, and/or data indicating healthcare service providers and/or medications recently removed from the healthcare insurance plan network, is obtained at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207, process flow proceeds to COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209.

In one embodiment, at COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209 the data indicating one or more healthcare service providers and/or medications used by a given healthcare consumer is compared with the data indicating all in-network healthcare service providers and/or medications for the given healthcare consumer's healthcare insurance plan, and/or data indicating healthcare service providers and/or medications recently removed from the healthcare insurance plan network.

In one embodiment, at COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209 the data indicating one or more healthcare service providers and/or medications used by a given healthcare consumer is compared with the data indicating all in-network healthcare service providers and/or medications for the given healthcare consumer's healthcare insurance plan, and/or data indicating healthcare service providers and/or medications recently removed from the healthcare insurance plan network, whenever new data indicating all in-network healthcare service providers and/or medications for the given healthcare consumer's healthcare insurance plan, and/or data indicating healthcare service providers and/or medications recently removed from the healthcare insurance plan network, is obtained.

In one embodiment, at COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209 the data is compared on a periodic basis such as, but not limited to: hourly; daily; weekly; monthly; quarterly; or any period defined and/or desired.

In one embodiment, at COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209 the data is compared using any one of numerous methods, means, processes, and/or procedures for comparing data, known in the art at the time of filing, or as developed after the time of filing.

As discussed above, in one embodiment, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207, data indicating healthcare service providers and/or medications recently removed from the healthcare insurance plan network for the given healthcare consumer's healthcare insurance plan is determined by comparing newly received data indicating all in-network healthcare service providers and/or medications for the given healthcare consumer's healthcare insurance plan with previous data indicating all in-network healthcare service providers and/or medications for the given healthcare consumer's healthcare insurance plan. In one embodiment, differences in the two data sets, and more particularly, healthcare service providers and/or medications that have been dropped in the newer data are then identified. In one embodiment, the healthcare service providers and/or medications that have been dropped are then placed on a newly dropped list. In one embodiment, at COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209 the healthcare service providers and/or medications on the newly dropped list is compared with the data indicating one or more healthcare service providers and/or medications used by a given healthcare consumer of OBTAIN DATA INDICATING ONE OR MORE HEALTHCARE PROVIDERS AND/OR MEDICATIONS USED BY A GIVEN HEALTHCARE CONSUMER OPERATION 203.

In one embodiment, at COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209 the data indicating one or more healthcare service providers and/or medications used by a given healthcare consumer is compared with data indicating all in-network healthcare service providers and/or medications for the given healthcare consumer's healthcare insurance plan, and/or data indicating healthcare service providers and/or medications recently added to the healthcare insurance plan network.

In one embodiment, once the data indicating one or more healthcare service providers and/or medications used by a given healthcare consumer is compared with the data indicating all in-network healthcare service providers and/or medications for the given healthcare consumer's healthcare insurance plan, and/or data indicating healthcare service providers and/or medications recently removed from the healthcare insurance plan network, at COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209, process flow proceeds to DETERMINE THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 211.

In one embodiment, at DETERMINE THAT AT LEAST ONE OF THE HEALTHCARE PROVIDERS AND/OR MEDICATIONS USED BY THE GIVEN HEALTHCARE CONSUMER IS NO LONGER AN IN-NETWORK PRO- VIDER AND/OR MEDICATION UNDER THE GIVEN HEALTHCARE CONSUMER'S HEALTHCARE INSURANCE PLAN OPERATION 211 as a result of the comparison of COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209, one or more of the one or more healthcare service providers and/or medications used by a given healthcare consumer is identified as no longer being an in-network healthcare service provider and/or medication for the given consumer.

As discussed above, in one embodiment, at OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207, data indicating healthcare service providers and/or medications recently removed from the healthcare insurance plan network for the given healthcare consumer's healthcare insurance plan is determined by comparing newly received data indicating all in-network healthcare service providers and/or medications for the given healthcare consumer's healthcare insurance plan with previous data indicating all in-network healthcare service providers and/or medications for the given healthcare consumer's healthcare insurance plan. In one embodiment, differences in the two data sets, and more particularly, healthcare service providers and/or medications that have been dropped in the newer data are then identified. In one embodiment, the healthcare service providers and/or medications that have been dropped are then placed on a newly dropped list. In one embodiment, at COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209 the healthcare service providers and/or medications on the newly dropped list is compared with the data indicating one or more healthcare service providers and/or medications used by a given healthcare consumer of OBTAIN DATA INDICATING ONE OR MORE HEALTHCARE PROVIDERS AND/OR MEDICATIONS USED BY A GIVEN HEALTHCARE CONSUMER OPERATION 203. In one embodiment, at DETERMINE THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 211 all healthcare service providers and/or medications used by a given healthcare consumer that are on the newly dropped list are identified.

In addition, recall that, in one embodiment, at COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209 the data indicating one or more healthcare service providers and/or medications used by a given healthcare consumer is compared with data indicating all in-network healthcare service providers and/or medications for the given healthcare consumer's healthcare insurance plan, and/or data indicating healthcare service providers and/or medications recently added to the healthcare insurance plan network. In this embodiment, at DETERMINE THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 211 as a result of the comparison of COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209, one or more of the one or more healthcare service providers and/or medications used, or previously used, by a given healthcare consumer is identified as now being an in-network healthcare service provider and/or medication for the given consumer.

In one embodiment, once one or more of the one or more healthcare service providers and/or medications used by a given healthcare consumer is identified as no longer being an in-network healthcare service provider and/or medication for the given consumer at DETERMINE THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 211, process flow proceeds to NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 213.

In one embodiment, at NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 213 the given healthcare consumer is then informed/notified of the change of one or more of the one or more healthcare service providers and/or medications used by the given healthcare consumer to out-of-network status.

In one embodiment, at NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 213 the given healthcare consumer is informed of the change of one or more of the one or more healthcare service providers and/or medications used by the given healthcare consumer to out-of-network status via any one of various means and/or mechanisms, discussed herein, and/or known in the art at the time of filing, and/or as developed after the time of filing.

For instance, in one embodiment, at NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 213, the given healthcare consumer is informed of the change of one or more of the one or more healthcare service providers and/or medications used by the given healthcare consumer to out-of-network status through one or more computing systems and/or server systems, such as computing systems 100 and 150 and/or server system 120 of FIG. 1, to one or more other computing systems and/or server systems via a network such as network 130 of FIG. 1.

Returning to FIG. 2, in one embodiment, at NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 213, the given healthcare consumer is informed of the change of one or more of the one or more healthcare service providers and/or medications used by the given healthcare consumer to out-of-network status by storing data indicating the change of one or more of the one or more healthcare service providers and/or medications used by the given healthcare consumer to out-of-network status on one or more databases, such as database 170 of FIG. 1, and/or in one or more accounts/locations of a database, and then providing the given consumer access to the data indicating the change of one or more of the one or more healthcare service providers and/or medications used by the given healthcare consumer to out-of-network status on the one or more databases and/or one or more accounts/locations of a database.

Returning to FIG. 2, in one embodiment, at NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 213, the given healthcare consumer is informed of the change of one or more of the one or more healthcare service providers and/or medications used by the given healthcare consumer to out-of-network status through/using one or more computing system implemented data management systems, such as computing system implemented data management system 180 of FIG. 1.

Returning to FIG. 2, in one embodiment, at NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 213, the given healthcare consumer is informed of the change of one or more of the one or more healthcare service providers and/or medications used by the given healthcare consumer to out-of-network status via e-mail, text messaging, or through/using a computer program product, as defined herein.

In one embodiment, at NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 213, the given healthcare consumer is informed of the change of one or more of the one or more healthcare service providers and/or medications used by the given healthcare consumer to out-of-network status via traditional postal service and/or telephone.

In some embodiments, at NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 213, the given healthcare consumer is informed of the change of one or more of the one or more healthcare service providers and/or medications used by the given healthcare consumer to out-of-network status by any means, mechanism, process, and/or procedure, for informing the healthcare consumer, as discussed herein, and/or known in the art at the time of filing, and/or as developed after the time of filing.

In one embodiment, once the given healthcare consumer is then informed of the change of one or more of the one or more healthcare service providers and/or medications used by the given healthcare consumer to out-of-network status at NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 213, process flow proceeds to EXIT OPERATION 230. In one embodiment, at EXIT OPERATION 230, process for providing healthcare consumers advance notice of changes in network status of their healthcare service providers and/or medications 200 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or groupings of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing healthcare consumers advance notice of changes in network status of their healthcare service providers and/or medications 200, a healthcare consumer is automatically informed that a healthcare service provider and/or medication used by the given healthcare consumer is no longer in the healthcare consumer's healthcare insurance plan network, potentially before the healthcare consumer needs the service and/or medication. As a result, using process for providing healthcare consumers advance notice of changes in network status of their healthcare service providers and/or medications 200, the healthcare consumer can potentially have time to research in-network replacements for his or her now out-of-network healthcare service provider and/or medication. Consequently, using process for providing healthcare consumers advance notice of changes in network status of their healthcare service providers and/or medications 200, healthcare consumers can minimize the stress and/or uncertainty associated with having a healthcare service provider and/or medication leave their healthcare insurance plan's network.

In one embodiment, when the given healthcare consumer is informed of the change of one or more of the one or more healthcare service providers and/or medications used by the given healthcare consumer to out-of-network status, the given healthcare consumer is also provided with one or more potential in-network replacements for the now out-of-network healthcare service providers and/or medications. In one embodiment, various information and/or analysis of the one or more potential in-network replacements is also provided to the given healthcare consumer.

Figure 3:
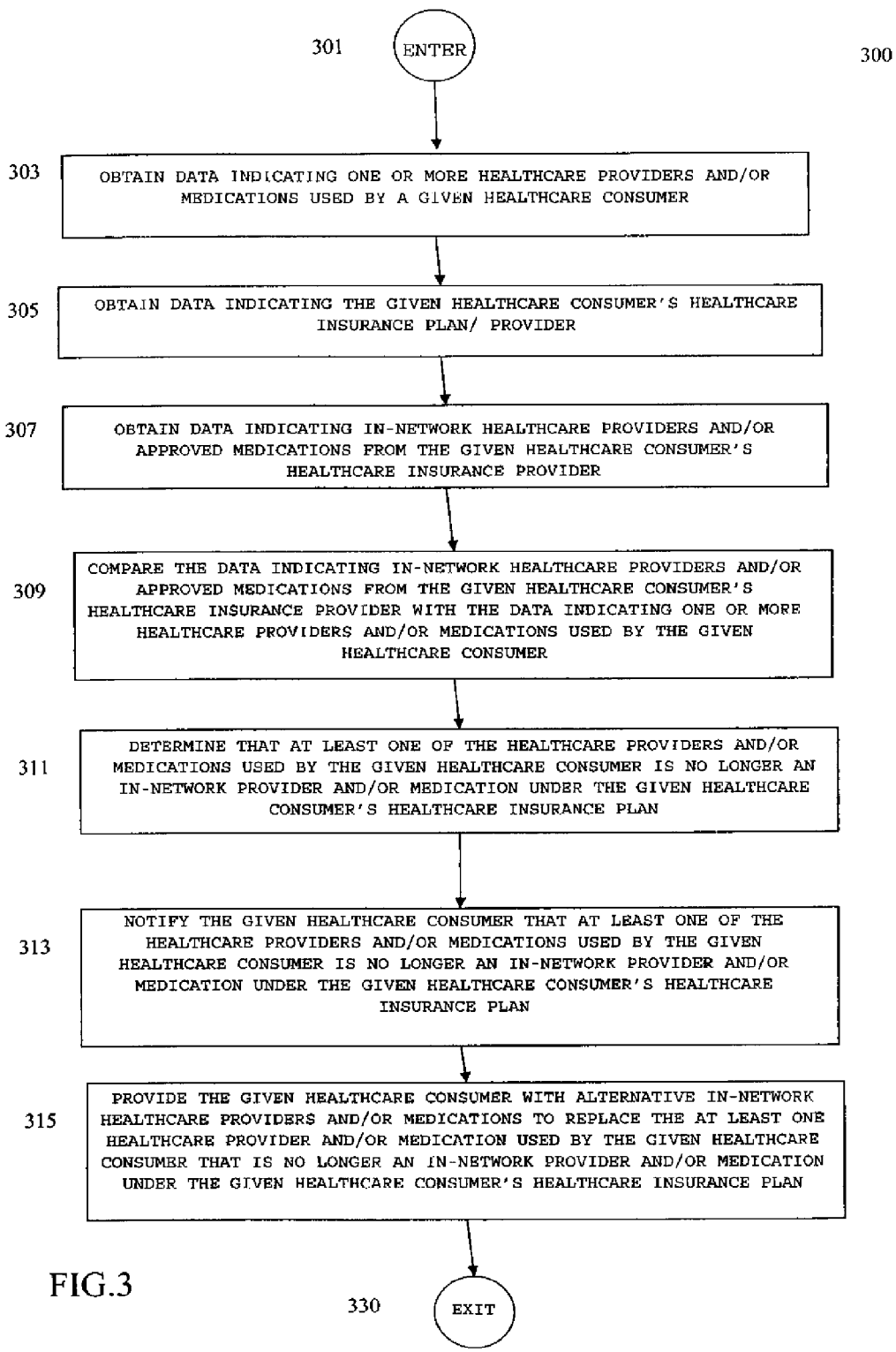
FIG. 3 is a flow chart depicting a process for providing healthcare consumers advance notice of changes in network status of their healthcare service providers and/or medications in accordance with one embodiment.

FIG. 3 is a flow chart depicting a process for providing healthcare consumers advance notice of changes in network status of their healthcare service providers and/or medications 300 in accordance with one embodiment. Process for providing healthcare consumers advance notice of changes in network status of their healthcare service providers and/or medications 300 begins at ENTER OPERATION 301 of FIG. 3 and process flow proceeds to OBTAIN DATA INDICATING ONE OR MORE HEALTHCARE PROVIDERS AND/OR MEDICATIONS USED BY A GIVEN HEALTHCARE CONSUMER OPERATION 303.

In one embodiment: OBTAIN DATA INDICATING ONE OR MORE HEALTHCARE PROVIDERS AND/OR MEDICATIONS USED BY A GIVEN HEALTHCARE CONSUMER OPERATION 303; OBTAIN DATA INDICATING THE GIVEN HEALTHCARE CONSUMER'S HEALTHCARE INSURANCE PLAN/PROVIDER OPERATION 305; OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 307; COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 309; DETERMINE THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 311; and NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 313, of process for providing healthcare consumers advance notice of changes in network status of their healthcare service providers and/or medications 300 of FIG. 3 are substantially identical to similarly named and numbered operations: OBTAIN DATA INDICATING ONE OR MORE HEALTHCARE PROVIDERS AND/OR MEDICATIONS USED BY A GIVEN HEALTHCARE CONSUMER OPERATION 203; OBTAIN DATA INDICATING THE GIVEN HEALTHCARE CONSUMER'S HEALTHCARE INSURANCE PLAN/PROVIDER OPERATION 205; OBTAIN DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER OPERATION 207; COMPARE THE DATA INDICATING IN-NETWORK HEALTHCARE PROVIDERS AND/OR APPROVED MEDICATIONS FROM THE GIVEN HEALTHCARE CONSUMER'S HEALTHCARE INSURANCE PROVIDER WITH THE DATA INDICATING ONE OR MORE HEALTHCARE PROVIDERS AND/OR MEDICATIONS USED BY THE GIVEN HEALTHCARE CONSUMER OPERATION 209; DETERMINE THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 211; and NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 213 of process for providing healthcare consumers advance notice of changes in network status of their healthcare service providers and/or medications 200 of FIG. 2.

Consequently, the discussion above with respect to process for providing healthcare consumers advance notice of changes in network status of their healthcare service providers and/or medications 200 of FIG. 2 is applicable to, and incorporated here, for similarly named and numbered operations of process for providing healthcare consumers advance notice of changes in network status of their healthcare service providers and/or medications 300 of FIG. 3.

Returning to FIG. 3, in one embodiment, once, or at the same time, the given healthcare consumer is informed of the change of one or more of the one or more healthcare service providers and/or medications used by the given healthcare consumer to out-of-network status at NOTIFY THE GIVEN HEALTHCARE CONSUMER THAT AT LEAST ONE OF THE HEALTHCARE PROVIDERS AND/OR MEDICATIONS USED BY THE GIVEN HEALTHCARE CONSUMER IS NO LONGER AN IN-NETWORK PROVIDER AND/OR MEDICATION UNDER THE GIVEN HEALTHCARE CONSUMER'S HEALTHCARE INSURANCE PLAN OPERATION 313, process flow proceeds to PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315.

In one embodiment, at PROVIDE THE GIVEN HEALTHCARE CONSUMER WITH ALTERNATIVE IN NET- WORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 when the given healthcare consumer is informed of the change of one or more of the one or more healthcare service providers and/or medications used by the given healthcare consumer to out-of-network status, the given healthcare consumer is also provided with one or more potential in-network replacements for the now out-of-network healthcare service providers and/or medications. In one embodiment, various information and/or analysis of the one or more potential in-network replacements is also provided to the given healthcare consumer.

For instance, in one embodiment, a community of healthcare consumers is defined, for instance all other healthcare consumers using the same healthcare insurance plan as the given consumer. In one embodiment, healthcare data associated with the community of users is obtained by any of the methods, means, mechanisms, or procedures discussed herein. In one embodiment, healthcare data associated with the community of users is stored by any of the methods, means, mechanisms, or procedures discussed herein.

In one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 the name of a medication determined to be now out of network is used to find similar, or generic, replacement medications that are still in-network, and then the given healthcare consumer is informed of those replacement medications.

In one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 the healthcare data associated with the community of users is searched to determine what replacement medications that are still in-network, are used by the community of healthcare consumers. In one embodiment, the given healthcare consumer is then informed of those replacement medications. In one embodiment, the data associated with the community of healthcare consumers includes demographic data associated with the members of the community of healthcare consumers so that only data associated with members of the community of healthcare consumers similarly situated to the given healthcare consumer is used, or is more heavily weighted. In one embodiment, the data associated with the community of healthcare consumers includes ratings data associated with replacement medications submitted by members of the community of healthcare consumers. In one embodiment, this data is also provided to the given healthcare consumer.

As another example, in one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 the type of service offered by a healthcare service provider determined to be now out of network is used to find similar replacement healthcare service providers that are still in-network, and then the given healthcare consumer is informed of those replacement healthcare service providers.

In one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 the healthcare data associated with the community of users is searched based on the type of service offered by a now out-of-network healthcare service provider to find replacement healthcare service providers offering the same the type of service that are still in-network, and are used by the community of healthcare consumers. In one embodiment, the given healthcare consumer is then informed of those replacement healthcare service providers. In one embodiment, the data associated with the community of healthcare consumers includes demographic data associated with the members of the community of healthcare consumers so that only data associated with members of the community of healthcare consumers similarly situated to the given healthcare consumer is used, or is more heavily weighted. In one embodiment, the data associated with the community of healthcare consumers includes ratings data associated with replacement healthcare service providers submitted by members of the community of healthcare consumers. In one embodiment, this data is also provided to the given healthcare consumer.

As another example, in one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 various attributes associated with a healthcare service provider determined to be now out of network, such as gender or age, is used to find similar replacement healthcare service providers that are still in-network, and then the given healthcare consumer is informed of those replacement healthcare service providers.

In one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTH- CARE CONSUMER'S HEALTHCARE INSURANCE PLAN OPERATION 315 the healthcare data associated with the community of users is searched based on the attributes associated with the now out-of-network healthcare service provider to find replacement healthcare service providers having the same, or similar, attributes that are still in-network, and are used by the community of healthcare consumers. In one embodiment, the given healthcare consumer is then informed of those replacement healthcare service providers. In one embodiment, the data associated with the community of healthcare consumers includes demographic data associated with the members of the community of healthcare consumers so that only data associated with members of the community of healthcare consumers similarly situated to the given healthcare consumer is used, or is more heavily weighted. In one embodiment, the data associated with the community of healthcare consumers includes ratings data associated with replacement healthcare service providers submitted by members of the community of healthcare consumers. In one embodiment, this data is also provided to the given healthcare consumer.

As another example, in one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 diagnosis and/or procedure codes assigned to a medication and/or attribute and/or service associated with a healthcare service provider determined to be now out of network, are used to find similar replacement medications and/or healthcare service providers that are still in-network, and then the given healthcare consumer is informed of those replacement medications and/or healthcare service providers.

In one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 the healthcare data associated with the community of users is searched based on the diagnosis and/or procedure codes assigned to a medication and/or attribute and/or service associated with a healthcare service provider to find replacement medications and/or healthcare service providers having the same, or similar, attributes that are still in-network, and are used by the community of healthcare consumers. In one embodiment, the given healthcare consumer is then informed of those replacement medications and/or healthcare service providers. In one embodiment, the data associated with the community of healthcare consumers includes demographic data associated with the members of the community of healthcare consumers so that only data associated with members of the community of healthcare consumers similarly situated to the given healthcare consumer is used, or is more heavily weighted. In one embodiment, the data associated with the community of healthcare consumers includes ratings data associated with replacement medications and/or healthcare service providers submitted by members of the community of healthcare consumers. In one embodiment, this data is also provided to the given healthcare consumer.

In one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 other types of analysis and/or comparisons of potential replacement medications and/or replacement healthcare service providers are performed, including, but not limited to: analyzing and providing healthcare consumer ratings lists for potential replacement medications and/or replacement healthcare service providers; analyzing and providing consumer scores for potential replacement medications and/or replacement healthcare service providers based on the appearance of potential replacement medications and/or replacement healthcare service providers on multiple healthcare consumer ratings lists and/or on multiple healthcare insurance plans; calculating various statistics associated with potential replacement medications and/or replacement healthcare service providers such as number of users, length of practice, or how long a medication has been on the market; or any other analysis and/or comparisons of potential replacement medications and/or replacement healthcare service providers desired.

In one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 the given healthcare consumer is provided with one or more potential in-network replacements for the now out-of-network healthcare service providers and/or medications, and/or the various information and/or analysis of the one or more potential in-network replacements, when the given healthcare consumer is informed of the change of one or more of the one or more healthcare service providers and/or medications used by the given healthcare consumer to out-of-network status, and by the same means.

In one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 the given healthcare consumer is provided with one or more potential in-network replacements for the now out-of-network healthcare service providers and/or medications, and/or the various information and/or analysis of the one or more potential in-network replacements, as text data attached to, and/or associated with, and/or included with, the data informing the given consumer of the change of one or more of the one or more healthcare service providers and/or medications used by the given healthcare consumer to out-of-network status.

In one embodiment, the given healthcare consumer is provided with one or more potential in-network replacements for the now out-of-network healthcare service providers and/or medications, and/or the various information and/or analysis of the one or more potential in-network replacements, by way of a URL link to a web-site or other database that appears with the data informing the given consumer of the change of one or more of the one or more healthcare service providers and/or medications used by the given healthcare consumer to out-of-network status.

In one embodiment, at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315 the given healthcare consumer is provided with one or more potential in-network replacements for the now out-of-network healthcare service providers and/or medications, and/or the various information and/or analysis of the one or more potential in-network replacements, by any of the means, mechanisms, processes, or procedures for transferring data discussed herein, and/or known in the art at the time of filing, and/or as developed after the time of filing.

In one embodiment, once the given healthcare consumer is provided with one or more potential in-network replacements for the now out-of-network healthcare service providers and/or medications and/or the various information and/or analysis of the one or more potential in-network replacements at PROVIDE THE GIVEN HEALTHCARE CONSUMER WITH ALTERNATIVE IN NETWORK HEALTHCARE PROVIDERS AND/OR MEDICATIONS TO REPLACE THE AT LEAST ONE HEALTHCARE PROVIDER AND/OR MEDICATION USED BY THE GIVEN HEALTHCARE CONSUMER THAT IS NO LONGER AN IN NETWORK PROVIDER AND/OR MEDICATION UNDER THE GIVEN HEALTHCARE CONSUMER'S HEALTHCARE INSURANCE PLAN OPERATION 315, process flow proceeds to EXIT OPERATION 330. In one embodiment, at EXIT OPERATION 330, process for providing healthcare consumers advance notice of changes in network status of their healthcare service providers and/or medications 300 is exited to await new data.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or groupings of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Using process for providing healthcare consumers advance notice of changes in network status of their healthcare service providers and/or medications 300, a given healthcare consumer is automatically informed that a healthcare service provider and/or medication used by the given healthcare consumer is no longer in the healthcare consumer's healthcare insurance plan network, potentially before the healthcare consumer needs the service and/or medication, and the healthcare consumer is provided with one or more potential in-network replacements for the now out-of-network healthcare service providers and/or medications and, in one embodiment, analysis data associated with the one or more potential in-network replacements. As a result, using process for providing healthcare consumers advance notice of changes in network status of their healthcare service providers and/or medications 300, the healthcare consumer can potentially have the time and data to consider and carefully choose in-network replacements for his or her now out-of-network healthcare service provider and/or medication. Consequently, using process for providing healthcare consumers advance notice of changes in network status of their healthcare service providers and/or medications 300, healthcare consumers can minimize the stress and/or uncertainty associated with having a healthcare service provider and/or medication leave their healthcare insurance plan's network.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, and/or protocols. Further, the system and/or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic and/or algorithm-like descriptions and representations are the means used by those of skill in the art to most effectively and efficiently convey the substance of their work to others of skill in the art. These operations, while described functionally or logically, are understood to be implemented by computer programs and/or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as "defining", "creating", "receiving", "analyzing", "obtaining", "identifying", "associating", "determining"; "initiating"; "collecting", "notifying", "creating", "transferring", "storing", "searching", "comparing", "providing", etc., refer to the action and processes of a computing system or similar electronic device that manipulates and operates on data represented as physical (electronic) quantities within the computing system memories, resisters, caches or other information storage, transmission or display devices.

Certain aspects of the present invention include process steps or operations and instructions described herein in an algorithmic and/or algorithmic-like form. It should be noted that the process steps and/or operations and instructions of the present invention can be embodied in software, firmware, and/or hardware, and when embodied, in software, can be downloaded to reside on and be operated from different platforms used by real time network operating systems.

The present invention also relates to an apparatus, means, or system for performing the operations described herein. This apparatus, means, or system may be specifically constructed for the required purposes, or the apparatus, means, or system can comprise a general purpose system selectively activated or configured/reconfigured by a computer program stored via a computer program product as defined herein that can be accessed by a computing system or other device.

Those of skill in the art will readily recognize that the algorithms and operations presented herein are not inherently related to any particular computing system, computer architecture, computer or industry standard, or any other specific apparatus. Various general purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of networks, are defined herein, operating over numerous topologies.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s are identified using a particular nomenclature for ease of description and understanding, but other nomenclature is often used in the art to identify equivalent operations.

In the discussion above, certain aspects of various embodiments include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

Therefore, numerous variations, whether explicitly provided for by the specification or implied by the specification or not, may be implemented by one of skill in the art in view of this disclosure.

What is claimed is:

1. A computing system implemented process for providing healthcare consumers advance notice of changes in network status of their healthcare service providers comprising:
   obtaining electronic data indicating one or more healthcare service providers previously used by a given healthcare consumer;
   obtaining data indicating a given healthcare insurance plan used by the given healthcare consumer;
   obtaining electronic data indicating all in-network healthcare service providers for the given healthcare insurance plan used by the given healthcare consumer;
   analyzing, by a computer, the electronic data indicating one or more healthcare service providers previously used by the given healthcare consumer and the electronic data indicating in-network healthcare service providers for the given healthcare insurance plan used by the given healthcare consumer and identifying at least one healthcare service provider used by the given healthcare consumer whose status has changed either from an in-network provider to an out-of-network provider or from an out-of-network provider to an in-network provider for the given healthcare insurance plan used by the given healthcare consumer, the process being operable to be able to determine both kinds of changes, the both kinds of changes comprising a change from an in-network provider to an out-of-network provider and a change from an out-of-network provider to an in-network provider; and
   notifying the given healthcare consumer of the at least one healthcare service provider used by the given healthcare consumer whose status has changed, providing the given consumer data representing one or more potential in-network replacement healthcare service providers for any identified at least one healthcare service provider used by a given healthcare consumer that is no longer an in-network healthcare service provider for the given healthcare insurance plan used by the given healthcare consumer, the one or more potential in-network replacement healthcare service providers being at least partly determined using healthcare data associated with a community of users similarly situated to the consumer.

2. The computing system implemented process for providing healthcare consumers advance notice of changes in network status of their healthcare service providers of claim 1, wherein;
   the electronic data indicating one or more healthcare service providers used by a given healthcare consumer is obtained by given healthcare consumer entering the data into a computing system using a user interface device.

3. The computing system implemented process for providing healthcare consumers advance notice of changes in network status of their healthcare service providers of claim 1, wherein;
   the electronic data indicating one or more healthcare service providers used by a given healthcare consumer is obtained from a computing system implemented data management system associated with the given healthcare consumer.

4. The computing system implemented process for providing healthcare consumers advance notice of changes in network status of their healthcare service providers of claim 1, wherein;

the computing system implemented data management system associated with the given healthcare consumer is a computing system implemented healthcare management system.

5. The computing system implemented process for providing healthcare consumers advance notice of changes in network status of their healthcare service providers of claim 1, wherein;
   the electronic data indicating one or more healthcare service providers used by a given healthcare consumer is obtained from a "hardcopy" personal health record associated with the healthcare consumer that is scanned into a computing system.

6. The computing system implemented process for providing healthcare consumers advance notice of changes in network status of their healthcare service providers of claim 1, wherein;
   the electronic data indicating one or more healthcare service providers used by a given healthcare consumer is obtained from digital copy of a personal health record associated with the healthcare consumer.

7. The computing system implemented process for providing healthcare consumers advance notice of changes in network status of their healthcare service providers of claim 1, wherein;
   the electronic data indicating one or more healthcare service providers used by a given healthcare consumer is obtained from a data source selected from the group of data sources consisting of:
   the given healthcare consumer's healthcare insurance plan provider;
   a health insurance plan administrator for the given healthcare consumer and/or the given healthcare consumer's healthcare insurance plan;
   a healthcare expense account program provider for the given healthcare consumer;
   a healthcare expense account program administrator for the given healthcare consumer;
   a healthcare service provider for the given healthcare consumer;
   employers of the given healthcare consumer; and
   websites and/or data sources.

8. The computing system implemented process for providing healthcare consumers advance notice of changes in network status of their healthcare service providers of claim 1, wherein;
   the electronic data indicating all in-network healthcare service providers for the given healthcare insurance plan used by the given healthcare consumer is obtained from the given healthcare consumer's healthcare insurance plan provider.

9. The computing system implemented process for providing healthcare consumers advance notice of changes in network status of their healthcare service providers of claim 1, wherein;
   the electronic data indicating all in-network healthcare service providers for the given healthcare insurance plan used by the given healthcare consumer is obtained from a listing of all in-network healthcare service providers provided by the given healthcare consumer's healthcare insurance plan provider.

10. The computing system implemented process for providing healthcare consumers advance notice of changes in network status of their healthcare service providers of claim 1, wherein;
    the electronic data indicating all in-network healthcare service providers for the given healthcare insurance plan used by the given healthcare consumer is obtained from a listing of all in-network healthcare service providers provided by the given healthcare consumer's healthcare insurance plan provider, the listing of all in-network healthcare service providers being provided in a data source selected from the group of data sources consisting of:
    a web-page;
    a database;
    a computer program product;
    a data file;
    an e-mail;
    a printed media;
    audio media; and
    video media.

11. The computing system implemented process for providing healthcare consumers advance notice of changes in network status of their healthcare service providers of claim 1, wherein;
    the electronic data indicating all in-network healthcare service providers for the given healthcare insurance plan used by the given healthcare consumer is obtained from a data source selected from the group of data sources consisting of:
    a health insurance plan administrator for the given healthcare consumer and/or the given healthcare consumer's healthcare insurance plan;
    a healthcare expense account program provider for the given healthcare consumer;
    a healthcare expense account program administrator for the given healthcare consumer;
    a healthcare service provider for the given healthcare consumer;
    employers of the given healthcare consumer; and
    screen scraping websites and/or data sources.

12. The computing system implemented process for providing healthcare consumers advance notice of changes in network status of their healthcare service providers of claim 1, wherein;
    the analysis of the electronic data indicating one or more healthcare service providers used by a given healthcare consumer and the electronic data indicating in-network healthcare service providers for the given healthcare insurance plan used by the given healthcare consumer is performed on a periodic basis.

13. The computing system implemented process for providing healthcare consumers advance notice of changes in network status of their healthcare service providers of claim 1, wherein;
    notifying the given healthcare consumer of the at least one healthcare service provider used by a given healthcare consumer that is not an in-network healthcare service provider for the given healthcare insurance plan used by the given healthcare consumer, is accomplished by a notification mechanism selected from the group of notification mechanisms consisting of:
    one or more computing systems;
    one or more server systems;
    a network or one or more computing systems and/or server systems;
    the Internet;
    one or more databases;
    one or more computing system implemented data management systems;
    e-mail;
    text messaging;
    a computer program product;

traditional postal service;
cellular telephone; and
traditional telephone.

14. A computing system implemented process for providing healthcare consumers advance notice of changes in network status of their medications comprising:
   obtaining electronic data indicating one or more medications previously used by a given healthcare consumer;
   obtaining data indicating a given healthcare insurance plan used by the given healthcare consumer;
   obtaining electronic data indicating all approved medications for the given healthcare insurance plan used by the given healthcare consumer;
   analyzing, by a computer, the electronic data indicating one or more medications previously used by the given healthcare consumer and the electronic data indicating approved medications for the given healthcare insurance plan used by the given healthcare consumer and identifying at least one medication used by the given healthcare consumer whose status has changed either from an in-network medication to an out-of-network medication or from an out-of-network medication to an in-network medication for the given healthcare insurance plan used by the given healthcare consumer, the process being operable to determine both kinds of changes, the both kinds of changes comprising a change from an in-network medication to an out-of-network medication and a change from an out-of-network medication to an in-network medication; and
   notifying the given healthcare consumer of the at least one medication used by the given healthcare consumer whose status has changed, providing the given consumer data representing one or more potential in-network replacement medications for any identified at least one medications used by a given healthcare consumer that is no longer an in-network medication for the given healthcare insurance plan used by the given healthcare consumer, the one or more potential in-network replacement medications being at least partly determined using healthcare data associated with a community of users similarly situated to the consumer.

15. The computing system implemented process for providing healthcare consumers advance notice of changes in network status of their medications of claim 14, wherein;
   the electronic data indicating one or more medications used by a given healthcare consumer is obtained by given healthcare consumer entering the data into a computing system using a user interface device.

16. The computing system implemented process for providing healthcare consumers advance notice of changes in network status of their medications of claim 14, wherein;
   the electronic data indicating one or more medications used by a given healthcare consumer is obtained from a computing system implemented data management system associated with the given healthcare consumer.

17. The computing system implemented process for providing healthcare consumers advance notice of changes in network status of their medications of claim 14, wherein;
   the computing system implemented data management system associated with the given healthcare consumer is a computing system implemented healthcare management system.

18. The computing system implemented process for providing healthcare consumers advance notice of changes in network status of their medications of claim 14, wherein;
   the electronic data indicating one or more medications used by a given healthcare consumer is obtained from a "hardcopy" personal health record associated with the healthcare consumer that is scanned into a computing system.

19. The computing system implemented process for providing healthcare consumers advance notice of changes in network status of their medications of claim 14, wherein;
   the electronic data indicating one or more medications used by a given healthcare consumer is obtained from digital copy of a personal health record associated with the healthcare consumer.

20. The computing system implemented process for providing healthcare consumers advance notice of changes in network status of their medications of claim 14, wherein;
   the electronic data indicating one or more medications used by a given healthcare consumer is obtained from a data source selected from the group of data sources consisting of:
   the given healthcare consumer's healthcare insurance plan provider;
   a health insurance plan administrator for the given healthcare consumer and/or the given healthcare consumer's healthcare insurance plan;
   a healthcare expense account program provider for the given healthcare consumer;
   a healthcare expense account program administrator for the given healthcare consumer;
   a healthcare service provider for the given healthcare consumer;
   employers of the given healthcare consumer; and
   websites and/or data sources.

21. The computing system implemented process for providing healthcare consumers advance notice of changes in network status of their medications of claim 14, wherein;
   the electronic data indicating all approved medications for the given healthcare insurance plan used by the given healthcare consumer is obtained from the given healthcare consumer's healthcare insurance plan provider.

22. The computing system implemented process for providing healthcare consumers advance notice of changes in network status of their medications of claim 14, wherein;
   the electronic data indicating all approved medications for the given healthcare insurance plan used by the given healthcare consumer is obtained from a listing of all approved medications provided by the given healthcare consumer's healthcare insurance plan provider.

23. The computing system implemented process for providing healthcare consumers advance notice of changes in network status of their medications of claim 14, wherein;
   the electronic data indicating all approved medications for the given healthcare insurance plan used by the given healthcare consumer is obtained from a listing of all approved medications provided by the given healthcare consumer's healthcare insurance plan provider, the listing of all approved medications being provided in a data source selected from the group of data sources consisting of:
   a web-page;
   a database;
   a computer program product;
   a data file;
   an e-mail;
   a printed media;
   audio media; and
   video media.

24. The computing system implemented process for providing healthcare consumers advance notice of changes in network status of their medications of claim 14, wherein;

the electronic data indicating all approved medications for the given healthcare insurance plan used by the given healthcare consumer is obtained from a data source selected from the group of data sources consisting of:

a health insurance plan administrator for the given healthcare consumer and/or the given healthcare consumer's healthcare insurance plan;

a healthcare expense account program provider for the given healthcare consumer;

a healthcare expense account program administrator for the given healthcare consumer;

a healthcare service provider for the given healthcare consumer;

employers of the given healthcare consumer; and screen scraping websites and/or data sources.

25. The computing system implemented process for providing healthcare consumers advance notice of changes in network status of their medications of claim 14, wherein;

the analysis of the electronic data indicating one or more medications used by a given healthcare consumer and the electronic data indicating approved medications for the given healthcare insurance plan used by the given healthcare consumer is performed on a periodic basis.

26. The computing system implemented process for providing healthcare consumers advance notice of changes in network status of their medications of claim 14, wherein;

notifying the given healthcare consumer of the at least one medication used by a given healthcare consumer that is not an approved medication for the given healthcare insurance plan used by the given healthcare consumer, is accomplished by a notification mechanism selected from the group of notification mechanisms consisting of:

one or more computing systems;

one or more server systems;

a network or one or more computing systems and/or server systems;

the Internet;

one or more databases;

one or more computing system implemented data management systems;

e-mail;

text messaging;

a computer program product;

traditional postal service;

cellular telephone; and traditional telephone.

* * * * *